United States Patent Office 3,178,803
Patented Apr. 20, 1965

3,178,803
METHOD OF MANUFACTURING LOGISTICAL SWITCHINGS

Marcel Schibli and Walter Rentsch, Zurich, Switzerland, assignors to Schweizerische Wagons- und Aufzugefabrik A.-G. Schlieren-Zurich, Schlieren, Switzerland Filed Aug. 29, 1961, Ser. No. 134,680
Claims priority, application Switzerland, Sept. 2, 1960, 9,904/60
2 Claims. (Cl. 29—155.5)

The present invention relates to a method of manufacturing logistical switchings by means of a pre-fabricated assembling unit having conductors arranged crosswise in two planes and using transistors as amplifying elements and further having in a number of points of crossing of the conductors resistances serving as coupling elements.

In a known method for assembling logistical switchings with transistors these switchings are obtained by means of printed circuits printed on both faces in crosswise arrangement and by mounting resistances in the points of crossing. These units are not very suitable for automatic provisions with resistances and the connection of the inserted resistances with the strips by dip soldering created great difficulties.

It is a prime object of the hereafter described invention to provide a method of manufacturing logistical switchings giving the possibility of inserting switching elements as well by hand as also automatically by machine and of securing such switching elements to the connectings by dip soldering, whereby the switching may be modified easily at any time and the heat produced by the connecting elements, for example by the resistances, may be evacuated without danger for the heat sensitive transistors.

According to the invention this object is attained by the use of metal strips as conductors and by mounting these metal strips provided with hooks in crosswise arrangement in two planes in a frame, whereafter the connections of the amplifying elements and of other coupling elements selectably insertable between the conductors in the points of crossing are clamped in these hooks and then are subsequently secured to their associated conductors in one working step.

Other features and advantages of the invention will become apparent from the description now to follow, and in which reference will be made to the acompanying drawings, in which.

Figure 1:
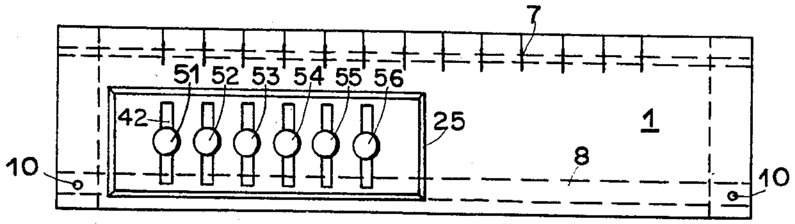
FIGURE 1 is a view of the circuit to be manufactured.

Referring now to the drawings reference numeral 1 designates a frame made of insulating material and consisting of frame components 3, 4, 5 and 6. Vertically positioned holding slots are provided in the upper plane or level of the frame components 3 and 4. These slots receive conductors having the shape of metal strips 7. The lower plane or level of the frame components 5 and 6 also is provided with vertically positioned holding slots receiving metal strips 8. The strips 7 of the upper plane and the strips 8 of the under plane together form a crosswise arrangement.

At each of their ends the metal strips 7 have a hole. A boring is provided at the level of the holding slots in the frame components 3 and 4. By means of insulating rods 9 fitted into these borings and holes, the metal strips 7 are held in place, and analogously the metal strips 8 are connected to the frame components 5 and 6 by means of insulating rods 10.

Figure 5:
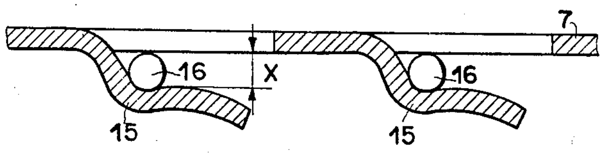
FIGURE 5 illustrates the hook at a metal strip.

The metal strips 7 and 8 are further provided in the points of crossing with hooks 15, details of which appear from FIGURE 5. Preferably the hooks 15 are punched out of the metal strips and pressed to the required shape. The shape is such that the distance $x$ between the hooks 15 and the metal strips is slightly less than the diameter of the connection wires 16 accommodated in the hooks and extending from switching elements 61 to 66 etc. By this arrangement the hook exerts a resilient force on the wire 16 so that the latter is clamped between the metallic strip and the hook. This clamping force is such that the switching elements 61 to 66 etc., such as resistances, diodes, connecting leads or the like, inserted in accordance with the circuit requirements between the metal strips in the points of crossing, are prevented from displacement during the subsequent manufacturing steps.

In the represented embodiment the hooks 15 are punched out of the metal strips. It is to be understood that these hooks could also be obtained from a separate wedge-shaped piece connected with a metal strip by spot-welding or by any other suitable connecting process.

The distance separating two adjacent metal strips 7 and 8, respectively, is selected so that the circuit elements may be brought into the inner space of the prefabricated crosswise arrangement and that their connections may be anchored in the desired hooks through the space between the strips. In series manufacture of the switching with circuit element having axial connections insertion of the circuit elements may advantageously be effected automatically by appropriate machine.

In the described embodiment the metal strips 7 and 8 are vertically arranged with respect to the frame 1 in order to obtain a minimum width and depth of the frame. In applications in which the height of the frame should be as small as possible the metal strips may be placed horizontally. Thereby, however, it is no longer possible to make use of the hooks 15 as connecting means for the switching elements and for this reason the points of crosing are provided with a hook taking the shape of a slightly tapering longitudinal slot for the metal strips, one end of this slot having an opening affording for the insertion of the connection.

Figure 2:
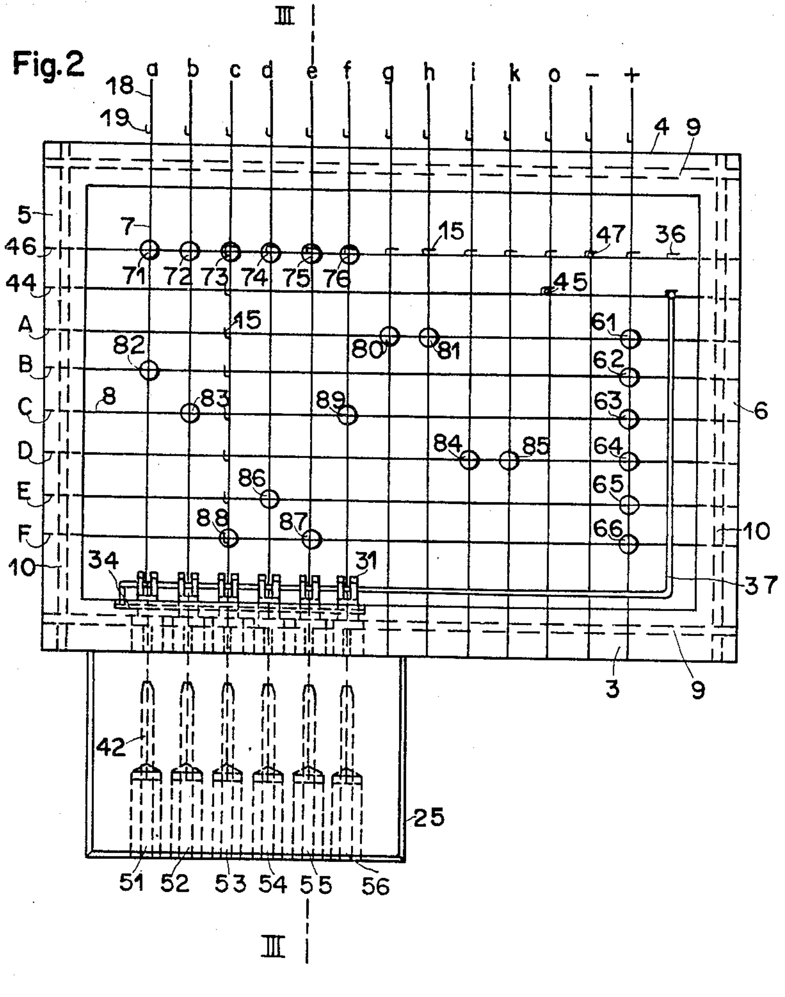
FIGURE 2 is a top view of this circuit.

The metal strips 7 (FIGURE 2) are provided with a prolongation 18 extending beyond the frame component 4 and having at least a hook 19. The latter has the same shape as the hook 15 and is intended to hold input and output conductors. The prolongations further serve for check purposes of the circuit by applying to these prolongations the terminals of check instruments.

Figure 3:
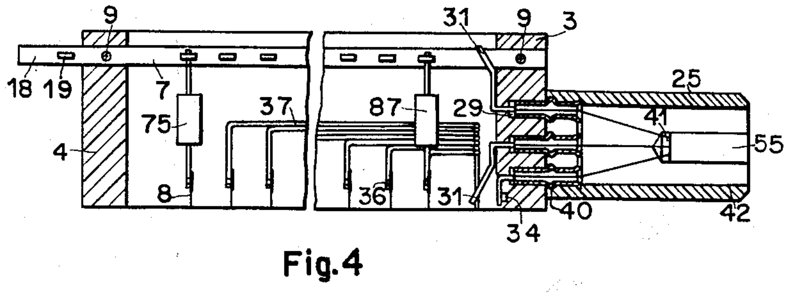
FIGURE 3 is a section taken along the line III—III of FIGURE 2.
Figure 4:
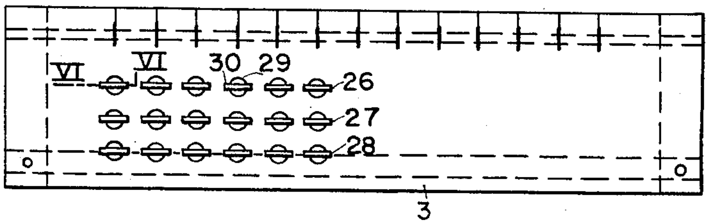
FIGURE 4 is a view of the circuit with the transistor block removed.
Figure 6:
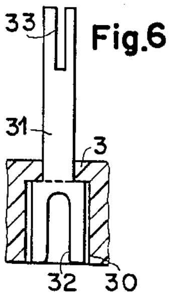
FIGURE 6 is a section taken along line VI—VI of FIGURE 4.

In order to have the possibility of checking at any desired time the transistors in the logistical switching the transistors are mounted in a block 25 adapted to be pinned to the frame component 3. Such an arrangement further has the advantage of preventing the heat produced by the resistances within the frame from damaging the transistors. This pinning of the block 25 to the frame component 3 is rendered possible by the provision in the frame component 3 of a number of passages 26, 27 and 28 (FIGURES 3 and 4) corresponding to the number of transistors in the block. All of these passages are of the same size and consist of a boring 29 and of a slot 30 in the frame component 3. The slot 30 receives a connecting clip 31 shown in FIGURE 6 and made of a conductive material having elastic characteristics. This clip has a fork pin 32 on one side and a slot 33 on the other side. After inserting clip 31 into the passages 26, the slot portions are upwardly bent in such manner that each slot 33 reaches into the corresponding metal strip 7. The clips 31 passed through the pasages 27 and 28 are bent downwardly. The clips 31 of the passages 28 have no slots 33 but contact a connection 34 in the frame component 3 so that these clips are short-circuited.

Each strip 8 has a further hook outside of the points of crossing. These outer hooks 36 hold a wiring 37 within the frame 1. The individual wires of this wiring connect the metal strips 8 with the corresponding clips 31 inserted through the passages 27 by their wire ends entering the slots 33.

As soon as the crosswise arrangement is provided with the desired circuit elements and the clips 31 and the connecting conductors have been mounted the connections are secured by soldering, and preferably by dip soldering, to the associated main conductors. It is also possible to connect the latter by a high frequency heating process.

The block 25 consists of insulating material in which are mounted three rows of pins 40. The block 25 further has borings 41 with slots 42. The borings receive the transistors 51–56 the connecting wires thereof being led through the slots 42 to the pins 40 and soldered thereto. The pins 40 are pinned into the borings 25 and held thereby, the clips 31 assuring the electrical connection with the corresponding metal strips 7 and 8, respectively. The pinning of the transistors 51 to 56 is effected in such manner that each collector is connected with the corresponding passage 28. Since the clips 31 of the passages 28 are short-circuited by the conductor 34 (FIGURE 2) all emitters of the transistors 51 to 56 are likewise short-circuited and lead over the wiring 37, a conductor 44 and a wire 45 to a grounded lead 0 of the upper plane. The collectors of the transistors 51 to 56 are connected through the clips 31 of the passages 26 with the corresponding metal strip 7 and the bases are connected through the clips 31 of the passages 27 and through the wiring 37 with the corresponding metal strip 8.

Figure 7:
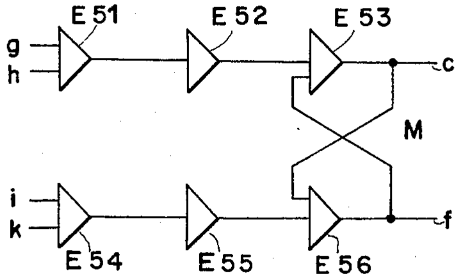
FIGURE 7 is a diagram of a logistical circuit.

With reference to the example of a logistical switching according to FIGURE 7 there shall now be illustrated the manner of operation of a prefabricated assembling unit consisting of the block 25, the mounted crosswise arrangement with inserted wiring and the pinned clips 31 but without soldering of these conductors.

The example is based on a known "nor"-element in which the inputs are applied over resistances to the base and the base over a polarisation resistance to a positive potential, while the collector is applied through a collector resistance to a negative potential and the emitter is grounded. Since in the described embodiment the block 25 has six transistors the switching diagram of FIGURE 7 also shows six "nor"-elements E51 to E56. The elements E51 and E54, respectively, have two inputs *g, h* and *i, k*, respectively, and their output serves as input to the elements E52 and E55, respectively. The outputs of elements E52 and E55, respectively, act upon the elements E53 and E56 of a memory element M having its outputs *c* and *f* serving as mutual inputs of these elements.

In order to facilitate the mounting of the circuit elements the conductors of the crosswise arrangement are designated as follows:

Upper plane: +, —, 0, *a–k*
Lower plane : A–F, 44 and 46

The conductors *a–f* represent outputs and the conductors *g–k* inputs. The conductors *a–f* are connected with the collectors and the conductors A–F are connected with the bases of the corresponding transistors. Accordingly the conductors *a* and A are associated with transistor 51, the conductors *b* and B to transistor 52 etc. The conductor 46 finally is connected to a minus-lead through a wire 47.

It appears from the above description that the base of each transistor is connected with the plus-lead through a polarisation-resistance. Thus the plus-lead is connected over the polarisation-resistances 61–66 with the corresponding conductors A–F. Likewise the collectors of the transistors 51–56 connected with the conductors *a–f* are connected with the negative lead 46 over collector-resistances 71–76.

According to the diagram of FIGURE 7 the input *g* leads to the element E51. Thus conductor *g* must be connected with the base of transistor 51 this being obtained by inserting a resistance 80 in the point of crossing between the conductors *g* and A. A further resistance 81 connects the conductor *h* through conductor A with a transistor 51. The output of transistor 51 must lead to the input of transistor 52, this being obtained by a resistance 82 in the point of crossing between the conductors *a* and B. By inserting a resistance 83 in the point of crossing of the conductors *b* and C the output of transistor 52 is led to the first input of transistor 53. By placing resistances 84 and 85 in the points of crossing of the conductor D with the conductors *i* and *k*, respectively, the inputs *i* and *k* are switched to the transistor 54. A resistance 86 in the point of crossing of the conductors *d* and E connects the output of transistor 54 with the input of transistor 55 the output of the latter leading to the first input of transistor 56 through a resistance 87 placed in the point of crossing of the conductors *e* and F. By placing a resistance 88 in the point of crossing of the conductors *c* and F and of a further resistance 89 in the point of crossing of the conductors *f* and C it is obtained that the outputs of the transistors 53 and 56 serve as mutual second inputs. The conductors *c* and *f* are the outputs of this logistical switching example while the leads *a, b, d* and *e* are reserved as outputs and do not have any output connections since they serve to the inner switching.

The described circuit example according to FIGURE 7 represents only a small part of a logistical switching. Several such devices are required to obtain a complete logistical switching whereby all frames 1 are stapled one upon the other and held together by not represented fastening members. This arrangement has the advantage of producing a chimney effect in the inner spaces of the frames 1, whereby the heat produced by the resistances is effectually evacuated.

The invention further has the advantage that a modification of the switching may take place at any time and easily by exchanging or removing some of the circuit elements in the crosswise arrangement.

We claim:

1. A method of producing an electrical circuit assembly with a two coordinate array of conductors forming a plurality of cross points adapted for connecting the terminals of the electrical components of said circuit, said method comprising forming a plurality of flat metal strips with uniformly spaced hooks thereon, positioning the electrical components of the circuit within a frame in their relative positions for connection at the cross points of the circuit, arranging the metal strips on said frame in two arrays of parallel strips, said arrays extending at angles to each other on either side of said components such that the hooks of the strips of each array are located on one side of the terminals of said components at substantially the same distance from said terminals, and displacing the strips of each array longitudinally to engage said terminals in the hooks of said strips so that said hooks are arranged at the crosspoints of said circuit and secure said components to said strips.

2. In a method as claimed in claim 1, wherein said electrical components are permanently secured to the corresponding strips by a single dip operation.

References Cited by the Examiner

UNITED STATES PATENTS

| | | | |
|---|---|---|---|
| 1,334,276 | 3/20 | Adams | 29—155.5 |
| 1,691,877 | 11/28 | Alden | 29—155.5 |
| 2,702,879 | 2/55 | Wheeler. | |
| 2,815,124 | 12/57 | Pellier | 29—155.5 |
| 2,829,426 | 4/58 | Franklin | 29—155.5 |
| 2,869,040 | 1/59 | Pifer | 29—155.5 |
| 2,898,522 | 8/59 | Handen | 317—101 |
| 2,902,628 | 9/59 | Leno | 29—155.5 |
| 2,916,805 | 12/59 | Plesser | 29—155.5 |
| 2,943,312 | 6/60 | Von Kummer et al. | 29—155.5 |
| 3,029,495 | 4/62 | Doctor | 29—155.5 |
| 3,098,950 | 7/63 | Geshner | 317—101 |

FOREIGN PATENTS

| | | |
|---|---|---|
| 750,244 | 6/56 | Great Britain. |

WHITMORE A. WILTZ, *Primary Examiner.*

JOHN F. CAMPBELL, *Examiner.*